July 19, 1932.    L. E. FEIGHTNER    1,868,282

FLEXIBLE COUPLING FOR SHAFTS

Filed March 29, 1930

INVENTOR
Lewis E. Feightner
BY
Symmestvedt + Lechner
ATTORNEYS

Patented July 19, 1932

1,868,282

UNITED STATES PATENT OFFICE

LEWIS E. FEIGHTNER, OF ELIDA, OHIO

FLEXIBLE COUPLING FOR SHAFTS

Application filed March 29, 1930. Serial No. 439,876.

This invention relates to flexible couplings for shafts and is more particularly concerned with flexible couplings for drive or other power shafts through which torque is transmitted, such as the drive shafts of geared locomotives.

One of the more important objects of the invention is the provision of means associated with a coupling of the type above referred to for permitting or effecting aligning adjustment of the coupled shafts either when initially assembled, or for the purpose of compensating for wear or maintaining balance of the parts, the said means being so arranged and configured with respect to the coupling parts as to lie substantially within the overall dimensions thereof and thus reduce the danger of breakage or damage during operation.

In addition, the present invention has in view the provision of means, lying within the overall dimensions of the other coupling parts, for securing or locking the shaft aligning means in any adjusted position, in order to avoid breakage of or damage to the locking means as well as loosening or loss of the shaft aligning means. The advantages of this arrangement will be apparent from a consideration of the severe nature of the service encountered in geared locomotive practice, where the coupled shafts are positioned at the outside of the truck wheels, subjected to vibration, dust and snow, etc.

The present invention also contemplates the provision of a coupling of the type referred to which is simple and rugged in construction as well as readily assembled or repaired.

The general nature of the invention, as well as other objects and advantages will appear from a consideration of the following description taken with the accompanying drawing which illustrates the preferred embodiment of the invention and in which—

Figure 2:
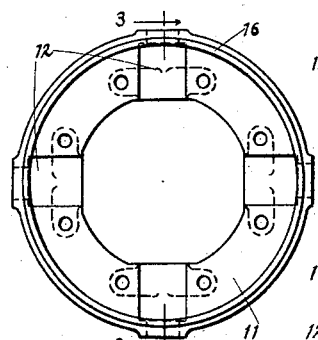
Fig. 2 is a side view of one of the coupling members or rings.

In considering the construction more in detail, it might be noted that the flexible coupling of the present invention is particularly adapted to be associated with shafts through which relatively great power must be transmitted, such, for example, as the driving power for a geared locomotive. The drawing illustrates the application of the coupling of the present invention to a drive shaft of such a locomotive and will be described in this connection.

Figure 1:
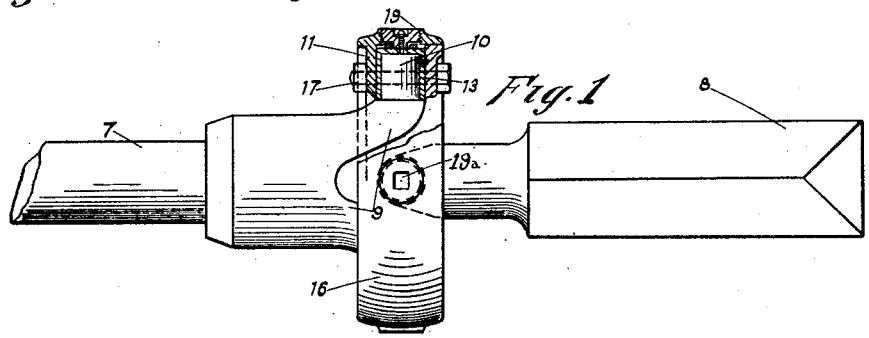
Fig. 1 is an elevational view of portions of coupled shafts to which the flexible coupling or joint of the present invention is applied, certain of the parts being shown in section for the sake of clarity.

Referring now more particularly to the drawing, the reference characters 7 and 8 indicate the coupled shafts. Each one of the shafts is forked as indicated at 9 in Fig. 1 and the ends of the fork legs or prongs are provided with finished bearing surfaces or parts 10 extending laterally or transversely of the axes of the respective shafts.

Figures 3, 4:
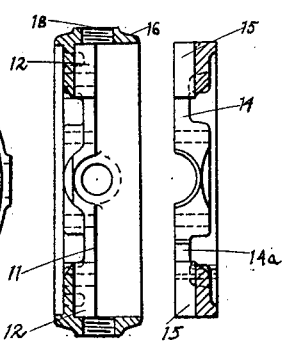
Fig. 3 is a sectional view taken as indicated by the line 3—3 of Fig. 2.
Fig. 4 is a sectional view similar to Fig. 3 of another of the coupling members taken as indicated by the line 4—4 of Fig. 5.
Figure 5:
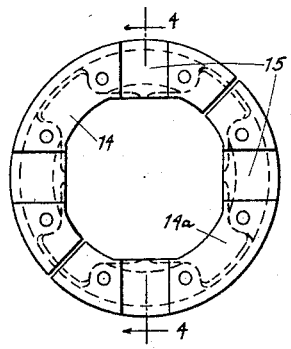
Fig. 5 is a side view of the member illustrated in Fig. 4.
Figure 6:
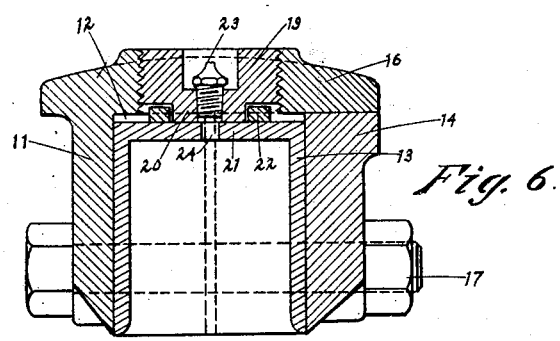
Fig. 6 is an enlarged sectional view illustrating certain details of the construction.

The coupling proper includes a member or ring 11 having sockets or recesses 12 therein adapted to receive the bearings 10 with the cup-shaped bushings 13 positioned at the ends thereof. The coupling further includes a second ring preferably formed in two parts 14 and 14a as indicated in Figs. 4 and 5 which is complementary to the ring 11 and which has sockets or recesses 15 therein which serve to properly position and secure the bearings 10 when the coupling parts are assembled (see Figs. 1 and 6). The ring 11, furthermore, is peripherally flanged as indicated at 16 and the various coupling parts are so relatively proportioned that the ring 14—14a telescopes or fits within the flange 16 in such manner as to complete the bearing cups or sockets when the parts are assembled. When so assembled the rings may be rigidly secured together as by means of the bolts 17.

If desired the coupling parts may be so formed as to permit the bushings 13 to float or turn within their respective sockets or, as indicated in the drawing, the parts may be so formed that the bushings 13 are rigidly secured in position by engagement with the coupling rings when the same are tightened together by means of the bolts 17.

At the base of each one of the bearing sockets, the flange 16 is provided with a threaded aperture 18 (see Fig. 3) which is adapted to receive the threaded member or plug 19. The inner end of each one of the members 19 is provided with a boss or projection 20 (see Figs. 1 and 6) which is adapted to bear against the base portion 21 of the cup 13 while the outer end of each of the plugs is provided with a squared recess 19a in order to accommodate a turning tool. These plug devices serve to align or relatively adjust the shafts 7 and 8 as will appear hereinafter.

In order to retain the member 19 in any particular adjusted position a lock washer 22 is preferably arranged around the boss 20 to react between the member 19 and the base 21 of the bushing 13. However, if desired, the plug 19 may be provided with an annular groove in its lower side adapted to receive the lock washer, or the plug may be provided with a circumferentially extending shoulder within which the locking member may be arranged.

In order to provide adequate and thorough lubrication of the working parts of the flexible coupling, a lubricating plug or nipple 23 is threaded through each one of the members 19 in such position as to register with the openings or apertures 24 in the bases of the cup-shaped bushings 13.

From the foregoing it will be apparent that when an adjustment is to be made, in order to initially align the shafts or to compensate for wear, the bolts 17 are loosened sufficiently to release the bushings 13 and permit the same to move longitudinally in the bearing sockets in order that the shafts may be adjusted transversely with respect to each other by screwing the plug members 19 into or out of the threaded apertures 18. When an adjustment is made or when the parts are initially set in this manner, the bolts 17 are tightened with the result that the cup-shaped bushings 13 are clamped or rigidly secured between the main ring members of the joint.

The present invention, therefore, contemplates the provision of a flexible or universal joint of the type above referred to wherein the various parts are simple and rugged in construction as well as readily adjustable to maintain alignment of the coupled shafts, provide proper balance and take up wear.

In addition it is observed that the positioning of the washers between the bearing bushings and the adjusting plugs provides a locking means automatically tending to maintain any given adjustment of the parts. The locking means, furthermore, lying within the overall dimensions of the other coupling parts is well protected during operation.

I claim:—

1. In a flexible joint for coupling shafts, the combination of bearing means associated with the shafts, a coupling member having bearing means complementary to the shaft bearing means, adjustable shaft aligning means operatively associated with said member and a shaft part, and a locking device for the aligning means interposed between said adjustable means and said shaft part.

2. A flexible coupling mechanism for a pair of shafts including bearing means associated with the shafts, a coupling member having bearing means complementary to the shaft bearing means, adjustable shaft aligning means carried by said member and operatively associated with the shaft bearing means and locking means for said adjustable means interposed between the adjustable means and a shaft bearing.

3. The combination of a pair of shafts each having laterally extended bearing means and means for flexibly connecting the shafts including a device having bearing means complementary to the shaft bearing means, and adjustable shaft aligning means carried by the member, together with means for locking the aligning means in adjusted position, the locking means being arranged to lie within the overall dimensions of the other shaft connecting parts and react between the aligning means and said laterally extended bearing means.

4. The combination of a pair of shafts each having a pair of laterally and oppositely extended bearings and means for flexibly connecting the shafts including a ring having sockets for the said bearings, said ring being provided with a threaded aperture at the bottom of a socket, and a member threaded into said aperture and having a boss reacting against the bearing housed therein, together with a lock washer around the said boss reacting between the said member and the bearing housed in the adjacent socket.

5. The combination of a pair of shafts each having a pair of laterally and oppositely extended bearings and means for flexibly connecting the shafts including a ring having sockets for the said bearings, said ring being provided with a threaded aperture at the bottom of a socket, and a member threaded into said aperture and having a boss reacting against the bearing housed therein, together with a bearing bushing having a part interposed between the last mentioned bearing and said boss and a lock washer surrounding said boss and reacting between the said member and the bushing.

6. The combination of a pair of shafts each having laterally extended bearing means and means for flexibly connecting the shafts including a device having bearing means complementary to the shaft bearing means, and adjustable shaft aligning means carried by the device, together with means for locking the aligning means in adjusted position, the locking means including a lock washer arranged to react between the aligning means and said laterally extended bearing means.

7. The combination of a pair of shafts each having laterally extended bearing means and means for flexibly connecting the shafts including a device having bearing means complementary to the shaft bearing means, and adjustable shaft aligning means carried by the device, together with means for locking the aligning means in adjusted position, the locking means including a lock washer arranged to react between the aligning means and said laterally extended bearing means, and said aligning means being configured to position the lock washer.

In testimony whereof I have hereunto signed my name.

LEWIS E. FEIGHTNER.